United States Patent [19]

Cramer, Jr. et al.

[11] Patent Number: 4,828,423
[45] Date of Patent: May 9, 1989

[54] TOLERANCE RING AND SHIM

[76] Inventors: Arthur A. Cramer, Jr., 11 N. Grant St., Hinsdale, Ill. 60521; Brian S. Cramer, R.R. 2, Box 174, Manhattan, Ill. 60442

[21] Appl. No.: 34,693
[22] Filed: Apr. 6, 1987
[51] Int. Cl.4 .................................. F16D 1/06
[52] U.S. Cl. .................. 403/372; 403/371; 403/376
[58] Field of Search ............... 403/365, 372, 297, 221, 403/326, 228, 357, 371, 369, 377; 416/244 R, 244 A; 411/516, 517

[56] References Cited

U.S. PATENT DOCUMENTS

| 1,662,544 | 3/1928 | Solenberger . | |
|---|---|---|---|
| 2,628,113 | 2/1953 | Jones | 403/357 |
| 2,897,026 | 7/1959 | Haller et al. . | |
| 2,931,412 | 4/1960 | Wing . | |
| 3,061,386 | 10/1962 | Dix et al. . | |
| 3,142,887 | 8/1964 | Hulck et al. . | |
| 3,145,547 | 8/1964 | Lyons . | |
| 3,156,281 | 11/1964 | Demi | 403/371 X |
| 3,197,243 | 7/1965 | Brenneke | 403/372 |
| 3,672,708 | 6/1972 | Zemberry | 403/326 X |
| 3,700,271 | 10/1972 | Blaurock et al. . | |
| 3,768,845 | 10/1973 | Gilliland | 403/372 |
| 3,838,928 | 10/1974 | Blaurock et al. . | |
| 3,861,815 | 1/1975 | Landaeus | 403/372 X |
| 4,222,310 | 9/1980 | Garrett et al. | 403/372 X |
| 4,286,894 | 9/1981 | Rongley . | |
| 4,367,053 | 1/1983 | Stratienko et al. | 403/371 |
| 4,376,254 | 3/1983 | Hellmann | 403/365 X |
| 4,569,614 | 2/1986 | Yamauchi | 403/372 X |
| 4,646,897 | 3/1987 | Winters | 403/326 X |

FOREIGN PATENT DOCUMENTS

| 253122 | 10/1963 | Australia | 403/372 |
|---|---|---|---|
| 624354 | 2/1963 | Belgium | 403/372 |
| 238798 | 4/1910 | Fed. Rep. of Germany . | |
| 1337146 | 7/1963 | France | 403/372 |
| 1372974 | 11/1974 | United Kingdom . | |

OTHER PUBLICATIONS

Advertisement from "Electrical Apparatus Electro Mechanical Bench Reference"—1985, p. 53.

Primary Examiner—Randolph A. Reese
Assistant Examiner—Peter M. Cuomo
Attorney, Agent, or Firm—Hill, Van Santen, Steadman & Simpson

[57] ABSTRACT

Improvements to tolerance rings are provided permitting them to be utilized in holding cylindrical members within sheet panels and providing positive axial retention of the ring in the sheet panel; permitting them to be used in centered and half-centered mounting arrangements without requiring the formation of shoulders on the engaged members, but rather through the use of an annular split ring shim; and permitting them to be used to restore the effective diameter of worn parts by providing the ring with a bowed shape.

11 Claims, 3 Drawing Sheets

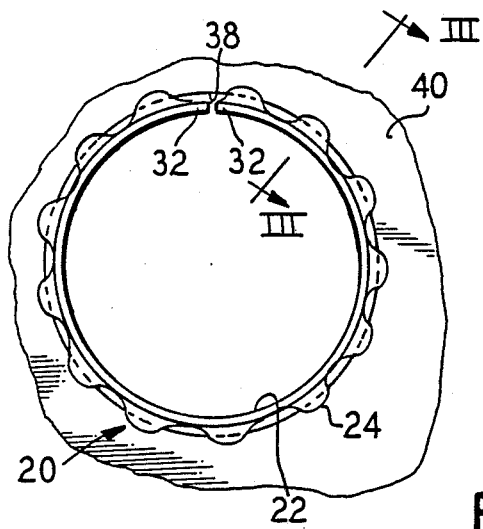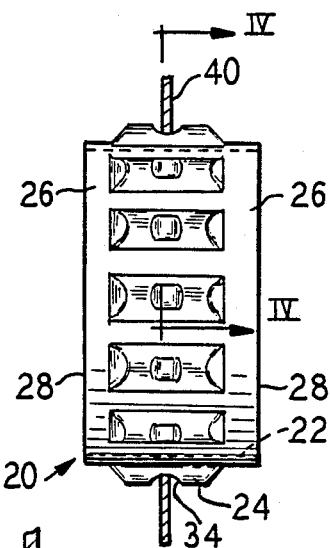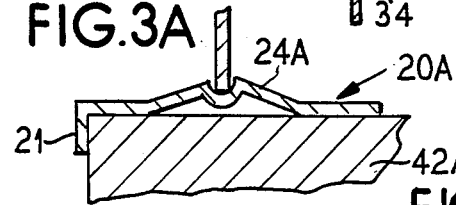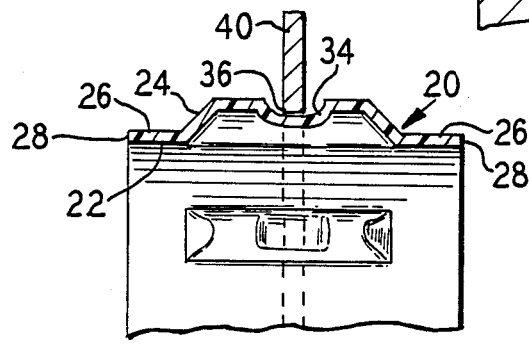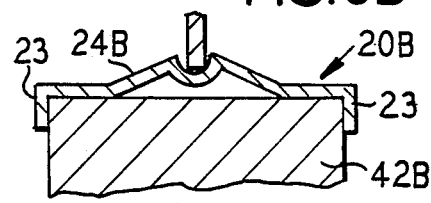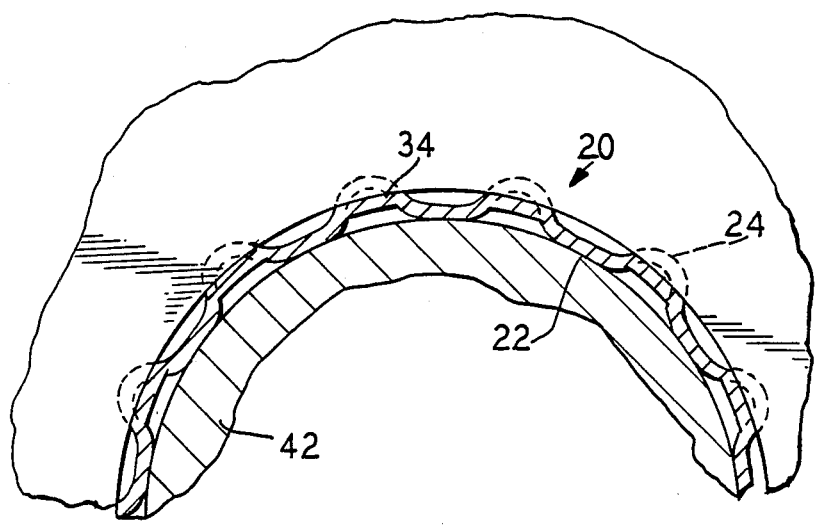

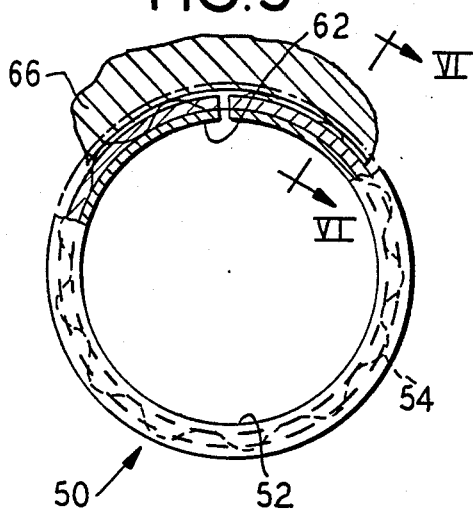
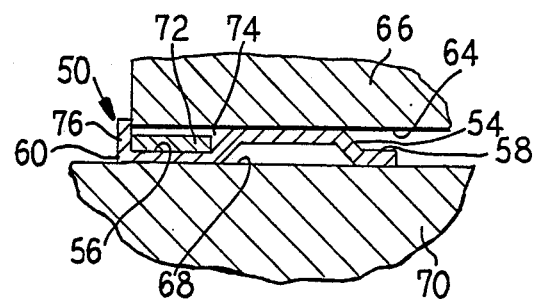
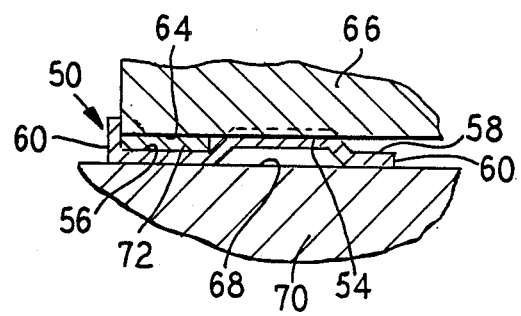
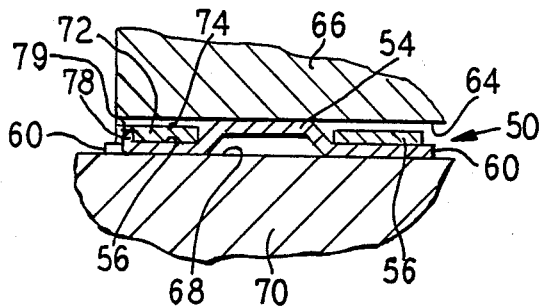
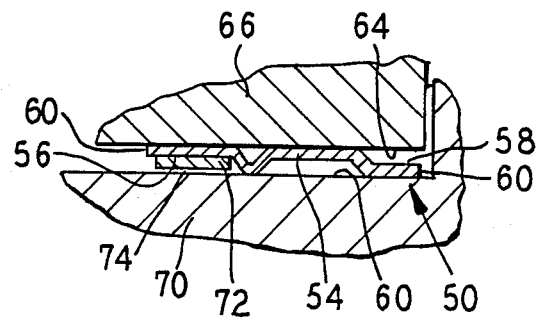

TOLERANCE RING AND SHIM

BACKGROUND OF THE INVENTION

1. Field of the Invention

The present invention relates to tolerance rings and more particularly to improvements in tolerance rings to provide for mounting in thin panels; centered and half centered mounting configurations; and restoring the usefullness of worn shafts.

2. Description of the Prior Art

Tolerance rings are generally formed as split ring members having a corrugated surface and are sandwiched between two cylindrical surfaces, that is, an outer cylindrical surface and an inner cylindrical surface, to provide frictional engagement between two members having the respective cylindrical surfaces. The corrugations on the ring may protrude inwardly from an outer surface thereof, outwardly from an inner surface thereof or alternatively inwardly and outwardly. Such tolerance rings are illustrated in U.S. Pat. Nos. 3,142,887 and 3,145,547. The corrugations on the tolerance rings may be of varying heights or may be arranged in more than one row around the circumference of the ring as illustrated in U.S. Pat. Nos. 3,700,271; 3,838,928 and 4,286,894.

In some applications it is desirable to mount a cylindrical member within a hole in a thin sheet panel and to keep the cylindrical member in a fixed axial position within the hole. Tolerance rings may be used to provide an increased frictional engagement between the cylindrical member and the hole in the panel, however, if there is a significant amount of vibration present, the tolerance ring may tend to move axially even to a point of disengagement with the hole, thereby resulting in a loss of frictional engagement between the cylindrical member and the panel. Thus, it would be desirable to have a means for preventing such axial movement of the tolerance ring.

In other applications, the tolerance ring is used in what is referred to as a centered arrangement or half centered arrangement especially when a tight concentricity specification is used or where greater radial shock loads are anticipated. In such a mounting arrangement, shoulders are provided adjacent to one or both axial ends of the tolerance ring on either the inner member or outer member. The shoulders have a height such that they do not generally engage the surface of the other member unless there is some radial load that moves the two members out of concentricity. The height of the shoulders is designed such that the shoulders will engage the opposing member just prior to the point at which the corrugations in the tolerance ring would reach their elastic limit during a crushing of the corrugations due to the radial load. Thus, the corrugations would retain their resiliency and usefullness despite occasional radial loads which would otherwise impair their usefullness. However, in such an arrangement at least one of the two members must be specially machined to provide the shoulders which adds to the costs of the parts. Further, in some applications, it may not be possible to machine the shoulders into the parts, especially if problems develop after the parts have been fabricated. Therefore, it would be an improvement if a means were provided for allowing a centered or half centered arrangement without the use of shoulders being formed on one or both adjacent members.

In still other applications, particularly those applications where a bearing is mounted on a shaft, the shaft often times becomes worn in the area of engagement with the bearing inner race, thus causing slippage between two parts due to a deterioration of the frictional engagement between the shaft and the surrounding bearing. In the past this has been rectified by a multistep procedure including a cleaning of the shaft, welding additional material onto the shaft in the worn area, grinding the welded material down to provide a smooth cylindrical surface in the previously worn area, heat treating the area to provide the required hardness and finishing the treated area to provide a smooth engaging surface. These steps are labor intensive and quite costly and therefore it would be an improvement if there were provided a more economical yet satisfactory means for upgrading the frictional engagement between a worn inner cylindrical member and an outer member with a cylindrical opening.

SUMMARY OF THE INVENTION

The present invention provides means for overcoming each of the problems described above. Specifically, a tolerance ring is provided in which the outwardly directed corrugations have an inwardly directed depression midway along their axial length such that when the tolerance ring is pressed into an opening in a sheet form member, the edges of the opening of the sheet form member will be captured in the inwardly directed depression thus providing a means for preventing axial movement of the retaining ring relative to the sheet form member. Once the inner cylindrical member is inserted into the interior of the tolerance ring, the parts will be positively locked together and the tolerance ring will be effectively prevented from axial movement even during severe vibration conditions.

To overcome the previous problem of requiring shoulders formed on one or both adjacent members to provide a half centered or centered mounting arrangement, the present invention provides a shim in the form of a split ring member similar to a tolerance ring, but without any corrugations. This shim would be used with a standard tolerance ring that has a widened planished area at one or both axial ends such that the shim would overlie or underlie the planished area whereby the combined thickness of the planished area and shim would be less than the height of the corrugation, but would be sufficiently great so as to bear any radial loads which would cause the corrugation to be crushed beyond its elastic limit.

Axial and/or angular retention means may be provided on the tolerance ring and/or shim to prevent relative axial and/or radial movement between the tolerance ring and shim assembly and relative movement between such assembly and the adjacent abuting surfaces.

A further improvement is provided for tolerance rings to overcome the worn shaft problem described above wherein a tolerance ring having inwardly directed corrugations is provided in which the ring is slightly bowed along its axial length such that a diameter at either axial end of the split ring is smaller than the diameter at the axial center of the ring. To repair the shaft - bearing coupling, the shaft would be machined on a lathe to provide a stepped groove having two, relatively shallow grooves for receiving the planished area of the tolerance ring and a central, slightly deeper groove for receiving the inwardly directed corrugations. The tolerance ring would be slipped over the shaft so that it is captured in the groove and, because of the slight outward bowing or convexity of the ring, when the bearing is pressed on to the shaft in the affected area, the engagement provided by the ring will be enhanced. The planished areas will be pressed into positive contact with the inner race of the bearing due to the biasing by the corrugations and due to the "natural" convex shape of the ring.

Thus, it is seen that the present invention provides improvements in tolerance rings to overcome each of the problems identified above in an economical manner.

BRIEF DESCRIPTION OF THE DRAWINGS

FIG. 1 is a plan view of a tolerance ring embodying the principles of the present invention including radially outwardly projecting corrugations and an inwardly directed depression in the corrugation.

FIG. 2 is a side elevational view of the tolerance ring illustrated in FIG. 1.

FIG. 3 is a sectional view of a tolerance ring taken generally along the lines III—III of FIG. 1.

FIG. 3A is a sectional view of an alternative embodiment of the invention in a tolerance ring with a single axial end flange.

FIG. 3B is a sectional view of an alternative embodiment of the invention in a tolerance ring with two axial end flanges.

FIG. 4 is a sectional view of a tolerance ring taken generally along the lines IV—IV of FIG. 2.

FIG. 5 is a plan view of a tolerance ring embodying the principles of the present invention including a widened planished area engaged by a split ring-shaped shim.

FIG. 6 is a sectional view of a tolerance ring taken generally along the lines VI—VI of FIG. 5.

FIG. 7 is a side sectional view of a tolerance ring as illustrated in FIG 6, experiencing an excessive radial load.

FIG. 8 is a sectional view of a tolerance ring in a centered arrangement including an angular retention means being provided between the tolerance ring and shim.

FIG. 9 is an alternative configuration of a tolerance ring with one planished area in an elevated position.

DESCRIPTION OF THE PREFERRED EMBODIMENTS

Figure 10:
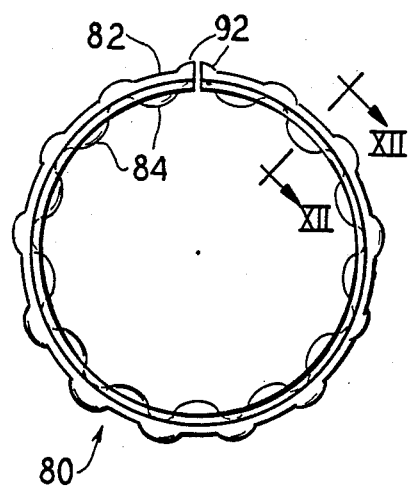
FIG. 10 is a plan view of a tolerance ring embodying the principles of the present invention including radially inwardly directed corrugations and a generally convex ring shape.

FIGS. 1–4 illustrate a tolerance ring generally at 20 embodying the principles of the present invention which has a cylindrical inner surface 22 and a plurality of radially outwardly projecting corrugations 24. As seen in FIGS. 2 and 3, the tolerance ring 20 includes planished areas 26 located adjacent to axial ends 28 of the ring. The planished areas 26 provide the cylindrical inner surface 22 of the ring which is a continuous surface along either axial end 28 and is an interrupted cylindrical surface between each of the radially projecting corrugations 24. The tolerance ring 20 is formed as a split ring having lateral ends 32 which are slightly spaced apart as seen in FIG. 1.

As best seen in FIGS. 2 and 3, the corrugations 24 are provided with a radially inwardly extending depression 34 midway along their axial length. The depressions 34 are sized to receive an edge 36 of a circular opening 38 in a sheet form panel member 40 to lock the tolerance ring 20 axially relative to the panel 40. To insert the ring 20 into the panel opening 38, the ring is squeezed such that the lateral ends 32 overlap thus reducing the diameter of the ring and permitting it to be inserted into the opening. When the ring is released, it springs outwardly to increase its diameter thus capturing the edge 36 of the panel opening 38 in the depressions 34. Subsequently, a cylindrical member 42 is pressed into the interior of the tolerance ring 20 to engage the inner cylindrical surface 22. Due to the resiliency provided by the corrugations 24, the inner cylindrical member 42 will be tightly held in place thus providing a secure mounting arrangement between the inner member 42 and the panel 40. The tolerance ring 20 will be positively locked in an axial direction relative to the panel 40 to prevent the ring 20 from becoming disengaged from the panel 40 even in a high vibration condition.

It will be appreciated that the placement of the depression 34 as well as the size of the depression can be modified to suit the particular application and thickness of the panel 40. Further, a reverse configuration of the corrugations and depressions could be utilized if the inner cylindrical member had a thin annular flange and the outer member had a cylindrical inner surface of a significant length. Also, in lieu of depressions 34, additional projections directed in the same direction as the corrugations could be provided, spaced apart axially on the corrugations to in effect form a depression therebetween above the "natural" surface of the corrugations.

FIGS. 3A and 3B illustrate alternative embodiments of the present invention wherein a tolerance ring 20A or 20B has a single 21 or double 23 axial end flange so that the ring may be captured on an inner member 42A or 42B. Generally, this capturing would occur prior to insertion of the ring into the opening in the panel, and thus corrugations 24A, 24B on these rings have a smaller slope to permit the ring-inner member assembly to be inserted into the opening. In this manner an inner member may be retained in one or both axial directions.

FIGS. 5–9 illustrate a tolerance ring generally at 50 embodying the principles of the present invention which has a cylindrical inner surface 52 and a plurality of radially outwardly projecting corrugations 54. As seen in FIGS. 6–9, the tolerance ring 50 includes one or two extra wide planished areas 56 and one or no narrower planished areas 58 adjacent to axial ends 60 of the ring. The planished areas 56, 58 provide the cylindrical inner surface 52 of the ring, being a continuous cylindrical surface along each axial end of the ring and an interrupted cylindrical surface between each of the radially projecting corrugations 54. Again, the tolerance ring 50 is formed as a split ring having lateral ends 62 which are shown in FIG. 5 as being slightly spaced apart.

As illustrated in FIGS. 6–9, the tolerance ring 50 is sandwiched between an inner cylindrical surface 64 of an outer member 66 and an outer cylindrical surface 68 of an inner member 70. The tolerance assures a snug fit between the inner member 70 and outer member 66 and, in varying degrees, provides a means for the transfer of torque and axial resistance between the two members. The inner cylindrical surface 52 of the tolerance ring abuts against the outer cylindrical surface 68 of the outer member 70 and the corrugations 54 abut against the inner cylindrical surface 64 of the inner member 66.

The corrugations 54, because of their resiliency, are able to concentrically position the inner member 70 relative to the outer member 66 and also are able to absorb a certain degree of radial load between the two members. However, if an excessive radial load is experienced, the corrugations 54 will crush beyond their elastic limit, generally a point which is approximately four fifths of their natural height, which would permanently deform the tolerance ring rendering it less effective or perhaps ineffective in providing the transfer of torque and axial resistance between the two members. In the past, this problem has been alleviated by forming shoulders on one or both of the inner or outer members adjacent to the axial ends 60 of the rings, which shoulders have a height sufficiently great to prevent permanent deformation of the corrugations. However, formation of such shoulders is costly and is not always possible.

The present invention provides for the combined use of one or more shims 72 to overlie or underlie the widened planished area 56 of the tolerance ring 50. The shim is a spliting member similar to the tolerance ring, but without corrugations. The shim member thickness is selected such that the combination of the thickness of the shim and the thickness of the widened planished area 56 is sufficiently great to cause engagement by the shim with the adjacent member prior to the corrugation being crushed beyond its elastic limit. Thus, the combined thickness of the planished area and shim is generally at least four fifths of the height of the corrugation. The combined thickness of the shim and planished area is less than the height of the corrugation such that there normally will be a gap 74 between the shim and the adjacent member.

FIG. 6 illustrates a half centered mounting arrangement in which only one axial end 60 is provided with a widened planished area 56 on which is positioned the shim 72. FIG. 6 also illustrates an axial retention means 76 formed on the axial end 60 of the tolerance ring to prevent axial movement of the tolerance ring to the right as is illustrated in FIG. 6. This axial retention means also positively captures the shim 72 preventing it from becoming dislodged from its assembled position. Such axial retention means for the tolerance ring is described in greater detail in our copending application Ser. No. 023,004.

FIG. 7 illustrates the tolerance ring and shim of FIG. 6 when an excessive radial load is present between the two members 66, 70 such that the corrugation 54 is crushed from its normal height (shown in a phanton position) causing an abutment of the shim 72 with the outer member 66. This engagement will prevent further crushing of the corrugation 54 thus preventing it from being crushed beyond its elastic limit. When the radial force is removed, the corrugation will be restored to its original height due to its resiliency.

FIG. 8 illustrates a centered mounting arrangement in which the tolerance ring 50 is provided with a widened planished area at both axial ends 60 of the ring thereby permitting the use of two shims 72. FIG. 8 also illustrates the use of an angular retention means comprising a short radially outwardly turned tab at one axial end 60 of the ring 50. Such a tab, which has a height less than the thickness of the shim, can engage in a short slot 79 in the shim 72 to prevent relative angular movement between the shim and the ring. Such an arrangement would also prevent axial movement of the shim 72 relative to the ring. Such angular retention means are also described in our copending application described above.

FIG. 9 illustrates an alternative configuration of the tolerance ring 50 having a single widened planished area 56 which is in an elevated position relative to the narrower planished area 58. In this instance, the tolerance ring 72 underlies or is positioned within the tolerance ring 50 in contrast to its overlying or engaging around the tolerance ring as illustrated in FIGS. 6–8. In all other respects, the function and operation of the ring and shim assembly remains the same.

A reversal of configurations is also possible from those illustrated in FIGS. 5–8 wherein the corrugations would project radially inwardly and the shim would underlie the ring. That is, the shim would engage an interior surface of the planished area, rather than an exterior surface as illustrated.

Figure 11:
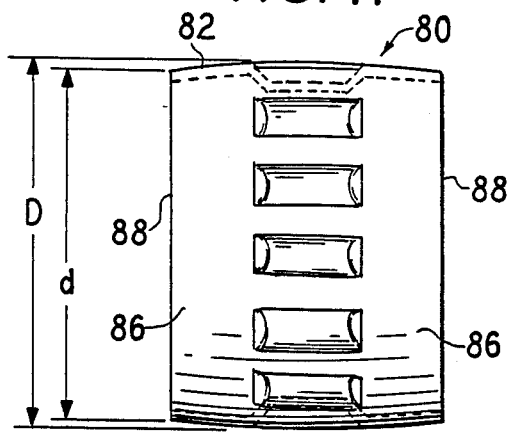
FIG. 11 is a side elevational view of the tolerance ring of FIG. 10.
Figure 12:
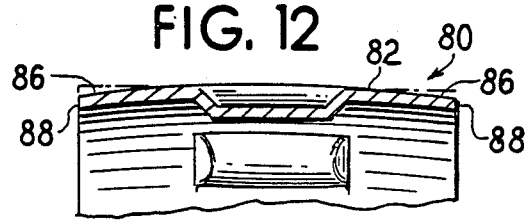
FIG. 12 is a partial sectional view taken generally along the lines XII—XII of FIG. 10.
Figure 13:
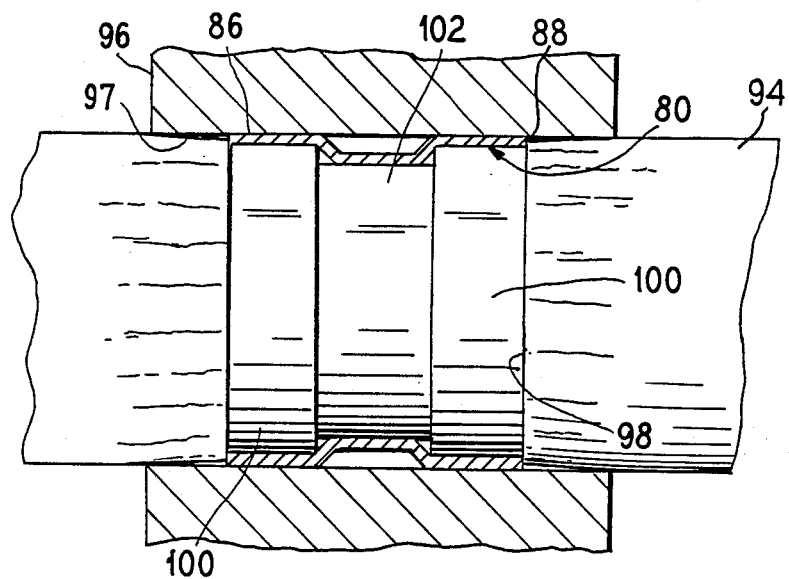
FIG. 13 is a sectional view of a tolerance ring in place on a shaft shown in elevation and engaged by a surrounding member shown in section.

FIGS. 10–13 illustrate a tolerance ring generally at 80 embodying the principles of the present invention which has a convex outer surface and a plurality of radially inwardly projecting corrugations 84. As seen in FIGS. 11–13, the tolerance ring 80 includes planished areas 86 located adjacent to axial ends 88 of the ring. As best seen in FIGS. 11 and 12, the lanished areas 86 form a portion of the convex outer surface 82 in which a diameter d of the ring adjacent to the axial ends 88 of the ring is less than a diameter D of the ring at a midpoint along the length of the ring. The tolerance ring is formed as a split ring having lateral ends 92 which are slightly spaced apart as illustrated in FIG. 10.

As illustrated in FIG. 13, the tolerance ring 80 is to be sandwiched between an inner cylindrical member 94 and an outer member 96 having a cylindrical opening 97. A particular environment in which this tolerance ring is useful is in the case where the inner cylindrical member 94 is a shaft which is engaged by an encircling inner bearing race being the outer member 96. Occasionally, such shafts become worn in the area of engagement between the shaft and the bearing such that the diameter of the shaft in the engagement area is reduced thereby degrading the degree of frictional engagement between the shaft and bearing resulting in a loss of torque transfered between the two members and perhaps also resulting in axial movement between the two members.

To avoid the costly building up and grinding down of the shaft as is required in presently available repair techniques, the tolerance ring disclosed can be utilized by first making a stepped groove 98 in the shaft 94 in which two longitudinal end areas 100 of the groove 98 are relatively shallow and a central area 102 is slightly deeper, whereby the planished areas 86 will be positioned around the longitudinal end areas 100 of the groove and the radially inwardly projecting corrugations 84 will project into the slightly deeper central area 102. The depth of the longitudinal end area groove portion and the thickness of the planished areas 86 are to be selected to provide an effective diameter of the shaft 94 equivalent to the original diameter of the shaft. The convex shape of the tolerance ring 80 will assure a tight engagement between the shaft 94 and the bearing 96 once the bearing 96 is pressed onto the ring 80 which previously is put into place around the shaft. Thus, the planished areas 86 will engage the bearing 96 to provide the required torque transfer and axial retention previously provided by the shaft.

In this manner, a worn shaft can be refurbished for continued use quickly and economically merely by the machining of the described stepped groove in the worn area of the shaft and by assembling a described tolerance onto the shaft to be captured in the stepped groove. Any future wear would generally be of the tolerance ring which can be quickly and easily replaced thereby avoiding further costly repair work.

Again, the configuration of the ring may be reversed in the event that the application requires that the stepped groove be formed in the interior surface of the outer member such as when the outer member has experienced the wear. In such a case, the corrugations would project outwardly and the ring would have a concave shape rather than a convex shape. That is, the cylinder walls would be bowed inwardly such that a diameter at the axial ends would be greater than a diameter between the two ends. In such a case, the ring again would first be engaged into the stepped groove and then the inner member would be pressed into the ring causing it to assume a linear cylindrical shape. Again, the planished areas would provide the restoration to original diameter size and due to the bowed nature of the cylinder and the corrugations, continuous biasing of the planished areas against the inner member would result.

Thus, it is seen that our present invention provides for improvements in tolerance rings permitting them to be utilized in holding cylindrical members within sheet panels and providing positive axial retention therein, providing half centered and centered mounting arrangements without requiring special machining of the abuting members and reducing the repair costs when one or both abuting members are worn in the engaging area.

As is apparent from the foregoing specification, the invention is susceptible of being embodied with various alterations and modifications which may differ particularly from those that have been described in the preceeding specification and description. It should be understood that we wish to embody within the scope of the patent warranted hereon all such modifications as reasonably and properly come within the scope of our contribution to the art.

We claim as our invention:

1. A tolerance ring and shim assembly, said tolerance ring being in the form of a split cylinder defining a longitudinal axis and having a plurality of laterally spaced, axially extending corrugations projecting radially from said cylinder, which is to be sandwiched between an inner cylindrical surface of an outer member and an outer cylindrical surface of an inner member an said shim being in the form of a split cylinder with a smooth surface, comprising:
   annular planished areas located between axial ends of said corrugations and axial ends of said tolerance ring;
   at least one shim separate from said tolerance ring and having a diameter sized to cause the shim to engage against at least one of said planished areas, a combined thickness of said shim and planished area being less than a height of said corrugations, but being greater than a height representing a height, below which the corrugations, if crushed to that height, would be beyond their elastic limit.

2. A tolerance ring and shim assembly according to claim 1, wherein a single shim is utilized which overlies an outer surface of one of said planished areas.

3. A tolerance ring and shim assembly according to claim 2, including axial retention means formed on said ring to relative to at least one of said members.

4. A tolerance ring and shim assembly according to claim 1, wherein two shims are utilized, each overlying an outer surface of separate ones of said planished areas.

5. A tolerance ring and shim assembly according to claim 4, including retention means for preventing axial movement in at least one direction of at least one of said shims.

6. A tolerance ring and shim assembly according to claim 1, including an axial retention means formed on said ring to prevent movement of said ring in at least one axial direction relative to at least one of said members.

7. A tolerance ring and shim assembly according to claim 1, including an axial retention means associated with said ring and shim to prevent said shim from moving axially relative to said ring beyond predefined limits.

8. A tolerance ring and shim assembly according to claim 1, including an angular retention means associated with said ring and shim to prevent said shim from rotating relative to said ring.

9. A tolerance ring and shim assembly according to claim 1, wherein said ring assembly comprises a planished area in elevated position relative to the axial ends of said corrugations and wherein a single shim is utilized which underlies an inner surface of said elevated planished area.

10. A tolerance ring and shim assembly comprising:
    a tolerance ring being in the form of a split ring cylinder defining a longitudinal axis and having a plurality of laterally spaced, axially extending and uniformly distributed corrugations which project radially from said cylinder and annular planished areas located between axial ends of said cylinder and said corrugations,
    said cylinder to be sandwiched between an inner cylindrical surface of an outer member and an outer cylindrical surface of an inner member; and
    a shim being in the form of a separate split smooth surface cylinder and having a diameter sized to cause said shim to engage against a planished area, a combined thickness of said shim and said planished area being less than a height of said corrugations, but being greater than a height at which the corrugations, if crushed to that height, would by beyond their elastic limit.

11. A tolerance ring and shim assembly comprising:
    a tolerance ring being in the form of a split ring cylinder defining a longitudinal axis and having a plurality of laterally spaced, axially extending corrugations of equal height projecting radially from said cylinder and annular planished areas located between axial ends of said cylinder and said corrugations, one of said planished areas being in an elevated position relative to the other planished area, said tolerance ring to be sandwiched between an outer surface of an inner member and an inner surface of an outer member; and
    a shim being in the form of a separate split smooth surface cylinder and having a diameter sized to cause said shim to engage against a planished area, a combined thickness of said shim and said planished area being less than a height of said corrugations, but being greater than a height at which the corrugations, if crushed to that height, would be beyond their elastic limit.

* * * * *